United States Patent [19]

Herring, Jr.

[11] 4,215,841
[45] Aug. 5, 1980

[54] VIBRATION ABSORPTION KIT FOR VEHICLE SEATS

[76] Inventor: Arthur J. Herring, Jr., 446-18th Ave., Indian Rocks Beach, Fla. 33535

[21] Appl. No.: 949,474

[22] Filed: Oct. 10, 1978

[51] Int. Cl.² .............................................. F16F 15/04
[52] U.S. Cl. .................................................... 248/635
[58] Field of Search ...................... 248/359.1, 615, 635; 267/140.3, 140.4, 141.1

[56] References Cited

U.S. PATENT DOCUMENTS

| | | | |
|---|---|---|---|
| 1,003,579 | 9/1911 | Bancroft | 267/140.4 X |
| 1,108,488 | 8/1914 | Bugg | 267/140.4 X |
| 1,822,026 | 9/1931 | Guy | 267/141.1 |
| 1,855,769 | 4/1932 | Paton | 248/635 |
| 1,876,640 | 9/1932 | Dobson | 248/635 |
| 2,115,653 | 4/1938 | Snyder | 248/635 |
| 3,084,211 | 4/1963 | Rapata | 248/615 X |
| 4,062,585 | 12/1977 | Herring | 297/195 |

*Primary Examiner*—William H. Schultz
*Attorney, Agent, or Firm*—James J. Cannon

[57] ABSTRACT

An absorption pad kit for the improved mounting of a truck, automobile or aircraft seat to isolate the seat from low frequency vibration by the incorporation of a plurality of resilient rubber-type compound pads which interpose juxtaposed seat support frame member interconnections and bolt connections. The resilient pads are configured and positioned to attenuate along the direct line of travel vibrations which are transferred to the seat through seat support frame members normally juxtaposed to a main seat support rails which is connected to the vehicle chassis. The interfacing pads intercept and dampen vibration paths which are normally transferred by rigid frame member interconnections.

2 Claims, 2 Drawing Figures

VIBRATION ABSORPTION KIT FOR VEHICLE SEATS

BACKGROUND OF THE INVENTION

1. Field of the Invention

The present invention relates to resilient seat mounting means particularly adapted to truck, automobile and aircraft seat mountings whereby a plurality of rubber-like pads are positioned between rigidly interconnected members to restrict and dampen the transmission path of vibration to the seat.

2. Description of the Prior Art

The present invention is designed to supplement and complement existing means of providing a reduction in the transmission of vibration from the chassis of a truck or automobile or from the airframe of an aircraft to the seats through supporting members of the seats. The invention does not contemplate the reduction of large shocks, that being the function of normal seat cushioning or springs. However, as will be evident from the following disclosure, the present invention will also dissipate the stress on structural members to some degree with respect to large shocks. The vibration absorbing pads of this kit and the relative placement thereof are contemplated primarily to reduce low frequency vibration transmitted to the seat from the motor, engine or, in the case of aircraft, thrust producing members, which can produce fatigue and discomfort. For drivers or pilots exposed to such vibration over long periods of time, various physical illnesses and nervous tension can result.

The relevant prior patent art is discussed in a prior patent of the inventor, U.S. Pat. No. 4,062,585, which teaches a similar vibration absorption pad kit for motorcycle and tractor seats. After reasonably extensive use of that kit and experimentation with truck seat mountings, the inventor developed the kit disclosed in this application.

The present invention may be incorporated into existing truck, automobile and aircraft seats inexpensively because no alteration of existing parts is contemplated. The invention simply consists of a kit of pads formed from a durable rubber-like compound which interface supporting seat frame members and securing components to intercept and to interrupt the transmissablility of vibrations to the seat.

SUMMARY OF THE INVENTION

The object of the present invention is the isolation of the seat of a truck, automobile or aircraft from vibration and, especially, from low frequency vibration transmitted from the engine, drive shaft, transmission, gears or propeller shaft of a vehicle or aircraft through the principal seat support and mounting members and the other related seat support frame members. This goal is accomplished by interposing resilient rubber-type compound pads primarily between members which transmit vibrations to other members which receive and further transmit the vibrations to the seat. Furthermore, bolts which interconnect the supporting members are also dampened with respect to vibration transmission by the placement of resilient pads through which the bolts protrude.

Generally, the invention comtemplates the positioning of a kit of the vibration absorbing pads between the main support rails which usually are longitudinally located under the seat and support members attached to the seat bottom. The resilient pads may be further positioned so that securing nut and washer combinations will also be interfaced by the pads. Not all bolt/or nut-washer and support member connections need be interfaced by a resilient vibration absorbing pad, however, if the connection is not in direct relation to the transmission path of vibration to the seat and if the bolt is adequately dampened by other absorbing pads. Use of the kit in the preferred embodiment does not require modification to the seat support frame members. This feature and further features may be more adequately related and described in regard to the following drawing and description thereof.

DESCRIPTION OF THE PREFERRED EMBODIMENT

Figures 1, 2:
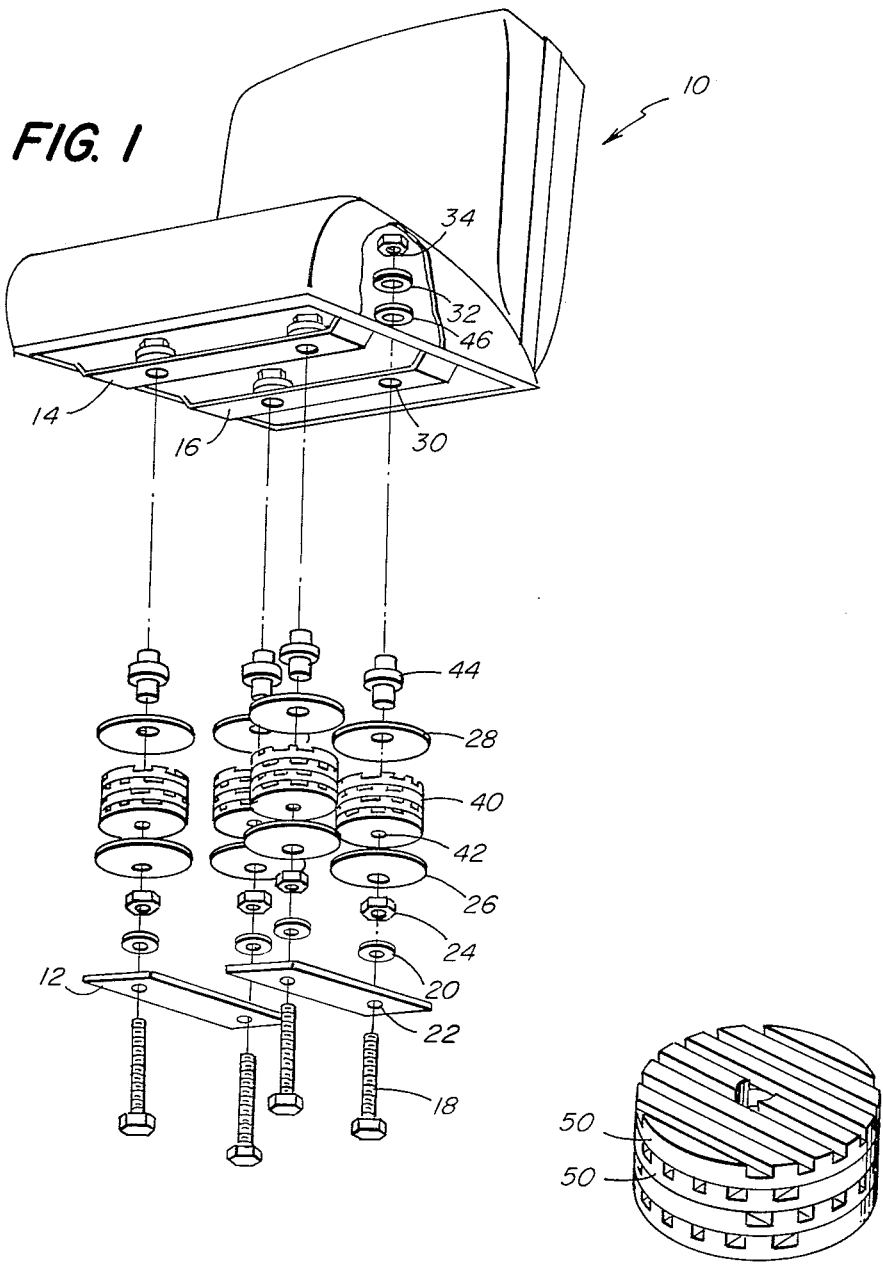
FIG. 1 illustrates an exploded perspective view of a typical vehicle seat and support structure embodiment incorporating the kit of resilient vibration absorbing pads in accordance with the principles of the present invention.
FIG. 2 is a perspective view of a typical resilient vibration absorbing pad used in the kit of this invention.

Illustrated in FIG. 1 is a standard truck seat 10 and its related supporting structure members as seen in a perspective exploded view, the phantom lines illustrating the relative position of the assembly members. Many automobile and aircraft seats have basically the same support structure assembly as that shown in FIG. 1. Main support rails 12 are generally longitudinally spaced apart and rectangularly shaped rails which are secured to the vehicle chassis or frame. Rails 12 provides the main support for seat 10. Seat 10 includes two spaced apart transverse frame members 14, 16 on its underside which provide the principal means for attachment of seat 10 to rails 12. In the present assembly of seat 10 to rails 12, a pair of bolts and associated washers and nuts are used to secure the front of rails 12 to front transverse bar 14 and a second pair of bolts and associated washers and nuts are used to secure the rear of rails 12 to rear transverse bar 16. Since all four bolt, washer, nut assemblies are identical, only one will be described in detail. Bolt 18 projects upwards through washer 20 and through a hole 22 in rail 12 to a lock nut 24, which secures bolt 18 to rail 12. Bolt 18 further projects upward through a concave steel washer 26 and a convex steel washer 28, then through a hole 30 in transverse bar 14 to a washer 32 and a nut 34. When nut 34 is tightened snugly, seat 10 is secured to and isolated from rails 12. Opposing concave washer 26 and convex washer 28 support pad 40. The resiliency of washers 26, 28 in the present state of the art provides the only vibration absorbing means present in the typical vehicle seat assembly.

Most of the vibrations transmitted to seat 10 will proceed upward from rails 12 and bolts 18 through washers 26, 28 to transverse seat support bars 14, 16. Washers 26, 28 are typically of a very large diameter. The rigidity of the connections of the seat 19 to its support rails 12 is the principal cause of the transmission of vibrations from the chassis to the seat.

To alleviate the transmission of these vibrations, vibration absorbing pads are positioned in the above-described assembly, in such a manner as to, in effect, be sandwiched between the concave-convex washers 26, 28. These washers grip the largest vibration absorbing pad in the kit to reduce the vibrational level between the main support rails 12 and the seat 10. Other vibration absorbing pads are utilized to reduce the transmission of vibrations through bolt 18.

The kit of vibration absorbing pads of the present invention, of which pad 40 of FIG. 1 is an example, consists of a plurality of pads dimensioned to conform in size and shape to the member portion which the pad will abut. The pads in this embodiment are substantially circular in shape. The pads will also be of a size large enough to adequately contain at least one aperture 42 of a diameter commensurate with the diameter of the securing bolt 18 to secure a snug fit.

Vibration absorbing pad 40 positioned between large concave washer 26 and large convex washer 28 is the principal vibration absorption pad used in the kit of this invention. Typically it will be about three and one-half inches in diameter and will be a multi-layered pad having the construction illustrated in FIG. 2. Isolation of the bolt 18 assembly from transverse bars 14, 16 is achieved by the utilization of vibration absorption pads 44 and 46. Pad 44 is a grommet pad having a lower portion of decreased diameter and some length to fit through the aperature in large diameter convex washer 28, a widened central portion which abuts the top of convex washer 28 and the base of transverse bar 14 and an upper portion of decreased diameter to fit through hole 30 in transverse bar 14. Bolt 18 is further isolated by vibration absorption pad 46 in the form of a washer which is positioned between washer 32 and the upper surface of transverse bar 14. The utilization of vibration absorption pads 40, 44 and 46 thus effectively isolates rails 12 from transverse seat bar 14 and bolt 18, washers 26, 28 and 32 and nut 34 from transverse seat support bar 14 also.

It should be noted that it is not critical that vibration absorption pads be placed between support rails 12 and abutting washer 22, nut 24 and washer 26 since the entire rail assembly is effective isolated by pad 40 from transverse bar 14. However, if desired, vibration absorption pads could be placed to interpose these members.

It should also be noted that all four bolt, nut, washer nut assemblies used to secure plate 12 to transverse bars 14, 16 of seat 10 are identical and identical vibration absorption pads are used on each bolt assembly.

Thus all pads 40, 44, 46, since they snugly fit the shaft of bolt 18 act to reduce the transmissioin of vibration by the bolt 18. Together, the pads reduce the vibrations incrementally, with large diameter, multilayer pad 40 initially absorbing the bulk of the vibrations in interaction with concave-convex washers 26, 28. Pads 44, 46 act to complete the reduction by isolating the bolt assembly from the transverse bars 14, 16.

Referring now to FIG. 2, a typical vibration absorption pad 50 is illustrated. This pad is sold under the regustered trademark ISOMODE. The vibration absorbing pads 50 contemplated to be used in the present invention should be a rubber-like resilient substance and may be constructed from neoprene, for example. Their hardness should range from a static loading of 50 to 150 pounds per square inch. The pads may have flat surfaces; however, the best results are obtained if the opposing surfaces have contoured ridges, each surfaces having the ridges running transverse to the other. The pads should have a durometer of 45.

The present invention therefore inhibits the transmission of vibrations from one supporting member to another which would be effected by direct contact of the members or through a securing bolt. The vibration absorbing pads isolate the areas which would transmit vibrations, and by placing several pads in the line of transmission, the reduction will occur incrementally. It is recognized that the present invention may be adapted to various types of truck seats, automobile seats and aircraft seats. The prime criteria are that all interfacing supporting members of the seats have vibration absorbing pads interposed therein and that the pads sufficiently interrupt all direct transmission paths including bolt heads and nut attachments.

It is thus desired that the present invention not be limited to the foregoing disclosure and that modifications and variations may be derived therefrom without departing from the spirit and scope of the following claims.

I claim:

1. A kit of resilient vibration absorption pad members of a rubber-type compound to insulate the seat of a truck, automobile, aircraft or similar type vehicle from high frequency vibrational emanations created by the vehicle chassis and power plant and transferred to the main seat support frame member attached to juxtaposed seat support frame members comprising:

a plurality of substantially circular pads dimensioned to conform to the surface area of said interconnecting juxtaposed seat support frame members abutted and interfaced by said pads, said pads positioned to interpose said seat frame members from direct contact to the interconnections, thereof to interrupt and to attenuate the direct line of vibrational transmission through said juxtaposed rigid seat frame member interconnections;

apertures within said pads positioned to correspond with apertures within said juxtaposed seat frame members to which said pads abut, dimensioned to receive snugly therethrough securing means, preferably bolts, which secure said seat support frame members;

at least one large circular contoured pad for insertion between a relatively large concave washer and a relatively large convex washer interposed between the main seat support rails of the vehicle chassis and the seat frame support members, said washers and pad being held in position by said securing bolt;

said large contoured circular pad conforming in size and shape to said washers, permiting the outer edges of said washers to overhang slightly to grip said pad snugly therebetween;

said large contoured pad having at least one aperture therethrough to receive said securing means therethrough, dimensioned to snugly receive said securing means;

at least one vibration absorption pad of generally cylindrical shape and serving as a grommet, having reduced diameter upper and lower portions such that the lower portion may be snugly received within said convex washer and the upper portion may be received within an aperture in said seat frame support members;

said grommet pad having at least one aperture therethrough to receive said securing means therethrough, dimensioned to snugly receive said securing means;

at least one vibration absorption pad of circular shape and serving as a washer interposed between the upper surface of the seat support frame member and a washer and nut of said securing means; and said washer pad conforming in size and shape to said washer and having at least one aperture therethrough dimensioned to receive said securing means snugly;

said grommet pad and said washer pad serving to isolate said securing means from said seat frame members;

said large pad serving to isolate said chassis plate from said seat frame members.

2. The vibration absorption pad kit of claim 1 wherein:

each of said resilient vibration absorbing pads has two ridged surfaces, each surface having ridges running transverse to the other and having a static load of 50 to 150 pounds per square inch and a durometer reading of 45.

* * * * *